Feb. 11, 1941.    G. G. MIZE    2,231,213
MULTIPLE STRAND CHAIN
Filed Oct. 14, 1939
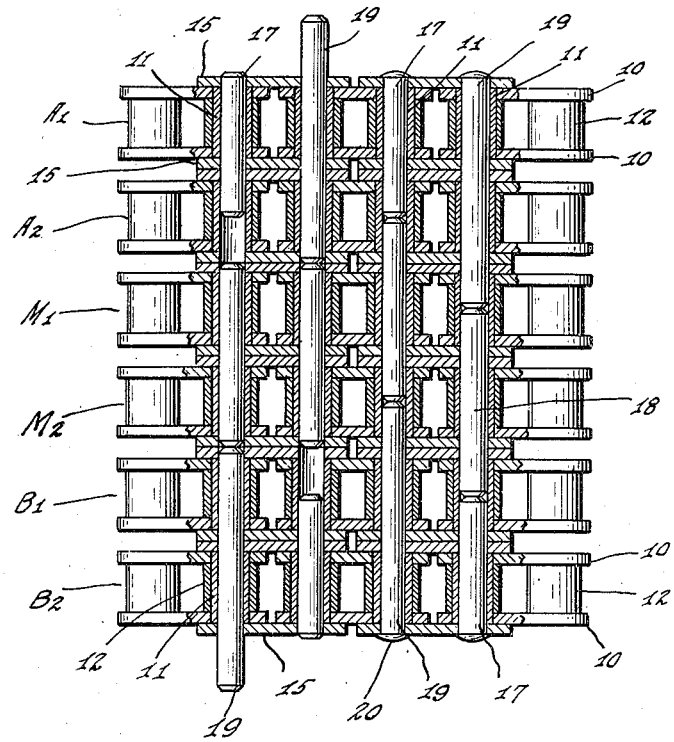
INVENTOR.
GEORGE G. MIZE
BY
ATTORNEYS.

Patented Feb. 11, 1941

2,231,213

UNITED STATES PATENT OFFICE 2,231,213

MULTIPLE STRAND CHAIN

George G. Mize, Indianapolis, Ind., assignor to Diamond Chain and Manufacturing Company, Indianapolis, Ind., a corporation of Indiana Application October 14, 1939, Serial No. 299,460

9 Claims. (Cl. 74—251)

Chain of the type to which this invention relates has heretofore been made of a plurality of strands of chain, each strand of which consists of a series of sprocket-engaging inner links interconnected by a series of outer links (or pin links) bearing pins which extend, for the entire width of the multiple-strand chain, through holes in the ends of the inner links. To prevent wear between the pins and the side plates of the pin links, it is essential that the pins have a press fit in such side plates; and as the number of strands in a multiple-strand chain increases, great difficulty is experienced in forcing the relatively long pins through all the side plates throughout the width of the completed chain.

It is the object of my invention to facilitate the production of multiple-strand chain and to eliminate the difficulty attendant upon forcing relatively long pins through a number of side plates in which they have a press fit.

In carrying out my invention, I use in place of each pin of prior chains a set of alined pins which abut against each other at points near the medial planes of inner links, the pins of adjacent sets preferably extending through more than one strand of chain and being staggered transversely of the chain so that the pins of adjacent sets do not abut within the same chain-strand.

The accompanying drawing illustrates my invention, the single figure being an elevation of a portion of a six-strand multiple-chain with portions thereof broken away.

The chain illustrated in the drawing is of the roller type, each inner link comprising a pair of spaced inner side plates 10, a pair of bushings 11 having a press fit in holes in the ends of such side plates, and rollers 12 rotatable on the bushings 11. While I have illustrated a roller chain, it is to be understood that my invention is not limited to that particular type, but that other types of chains such as solid-block chain and bushing-block chain are within the scope of my invention.

Each strand of the chain consists of a row of inner links such, for example, as the roller-links above described, interconnected by a series of outer or pin links each of which comprises a pair of outer side plates 15 and pins which extend through the bushings 11 and have a press fit in holes in the ends of the outer side plates.

As indicated above, it has heretofore been the practice in a multiple-strand chain to employ in the pin links pins which extended for the full width of the chain. In employing my invention, however, I depart from this practice and substitute for each single full-length pin a series of pins abutting against each other near the medial planes of the inner links—i. e., in the chain illustrated, near the center of the bushings 11. In the particular six-strand chain shown in the drawing, each set of pins comprises a short pin 17, a pin 18 of intermediate length, and a long pin 19, the pins being so arranged that one short pin 17 and one long pin 19 are in the same pin-link at each side of the chain. As shown at the right of the drawing, where I have illustrated the chain in finished condition, each of the short pins 17 extends from one side of the chain through the outer chain-strand and half-way through the next strand; each intermediate pin 18 extends through an inner strand and half-way through both adjacent strands; and each long pin extends from one side of the chain through two strands and half-way through a third strand. After the chain has been assembled with the pins in the positions described, the ends of the long and short pins 17 and 19 at each side of the chain are riveted or otherwise expanded as indicated at 20 to hold the adjacent side plate 15 in place.

In the preferred method of assembling a multiple-strand chain embodying my invention, a chain of the desired width is preferably not formed in a single operation from individual chain-strands, but instead the individual chain-strands are first assembled into a plurality of sub-assemblies, and a plurality of these sub-assemblies are then put together to form the finished chain. Thus, I have illustrated in the drawing the finished chain as being made up of two outer sub-assemblies each consisting of two strands and a center assembly also consisting of two strands. The sub-assembly at one side of the chain consists of two strands $A_1$ and $A_2$. Each of the pin links of such sub-assembly comprises a short pin 17 and a long pin 19, one end of the short pin being flush with one side of the sub-assembly and the opposite end of the long pin being flush with the other side of the sub-assembly. The other outer sub-assembly, consisting of two strands $B_1$ and $B_2$, is identical with the sub-assembly $A_1$—$A_2$.

The center sub-assembly in the chain shown in the drawing consists of two strands $M_1$ and $M_2$ the pin-links of which all embody pins 18 equal in length to the width of the sub-assembly. In assembling this sub-assembly $M_1$—$M_2$, the pins 18 are positioned so that their ends are approximately flush with the opposite faces of the sub-assembly.

To assemble the complete chain, the two outer sub-assemblies $A_1$—$A_2$ and $B_1$—$B_2$ are positioned on opposite sides of one or more of the center sub-assemblies $M_1$—$M_2$, with each long pin 19 of each of the outer sub-assemblies alined with a short pin 17 of the other outer sub-assembly, as indicated by the two sets of pins at the left of the drawing. Pressure is then applied to the projecting ends of the long pins to displace them until their outer ends are substantially flush with the side plates 15 at the sides of the chain. The intermediate pins 18 are moved with the long pins 19; and, at the completion of movement of each long pin, the alined short pin will be in approximate engagement with the adjacent pin 18 of intermediate length, as indicated in the two sets of pins at the right of the drawing. In this condition, the several pins in each set will abut against each other at points near the center of the bushings 11. As a final step in assembly, the outer ends of the pins 17 and 19 are riveted over or otherwise enlarged as above described.

While I have shown each sub-assembly in the drawing as consisting of two strands of chain, it is not necessary that this number of strands be employed. I prefer to employ at least two strands in each sub-assembly, however, in order that each of the several pins will be received in pin-link side plates 15 at at least two spaced points. This is of importance, not only in providing support for the pins against beam-loads, but also in holding the several strands of the chain together, for the press fit of the pins within the pin-link side-plates 15 is all that prevents transverse separation of the several chain-strands. It is not essential that each pin have a press fit within all the side-plates through which it passes; nor is it necessary that the staggering of the pins transversely of the chain be a staggering of the pins of each pair of adjacent pin-sets.

I claim as my invention:

1. In a multiple-strand chain, a plurality of chain-strands each comprising a row of inner links and pin-link side-plates disposed on opposite sides of and overlapping adjacent ones of said inner links, the inner links and side-plates of the several chain-strands being provided with sets of alined holes extending transversely of the chain, and a set of alined pins in each such set of holes, adjacent pins of each set meeting within an inner link and having a press fit in at least some of the side-plates through which they extend.

2. The invention set forth in claim 1 with the addition that the pins in adjacent sets are staggered so that each inner link has at least one pin extending completely through it.

3. The invention set forth in claim 1 with the addition that the pins associated with each side-plate at the sides of the chain are of different lengths and have their inner ends located in inner links of different strands.

4. In a chain, a plurality of parallel rows of inner links, pin-link side plates disposed between adjacent rows of inner links and at the outer side of each outer row of inner links, the inner links and the side plates being respectively alined transversely of the chain with each side plate overlapping adjacent inner links, said inner links and side-plates being provided with sets of alined holes extending transversely of the chain, and a plurality of pins in each such set of alined holes, the pins having a press-fit within at least some of the side-plates through which they pass, adjacent pins in each set meeting within an inner link and the pins in adjacent sets being staggered so that at least one pin will extend completely through each inner link and into the links on opposite sides of it.

5. In a chain, a plurality of parallel rows of inner links, pin-link side plates disposed between adjacent rows of inner links and at the outer side of each outer row of inner links, the inner links and the side plates being respectively alined transversely of the chain with each side plate overlapping adjacent inner links, said inner links and side-plates being provided with sets of alined holes extending transversely of the chain, and a plurality of pins in each such set of alined holes, the pins having a press-fit within at least some of the side-plates through which they pass, adjacent pins in each set meeting within an inner link.

6. In a multiple-strand chain, a plurality of chain-strands each comprising a row of inner links and pin-link side-plates disposed on opposite sides of and overlapping adjacent ones of said inner links, the inner links and side-plates of the several chain-strands being provided with sets of alined holes extending transversely of the chain, and a set of alined pins in each such set of holes, said pins having a press-fit in at least some of the side plates through which they extend, the pins of adjacent sets being staggered transversely of the chain.

7. In a multiple-strand chain, a plurality of chain-strands each comprising a row of inner links and pin-link side-plates disposed on opposite sides of and overlapping adjacent ones of said inner links, the inner links and side-plates of the several chain-strands being provided with sets of alined holes extending transversely of the chain, and a set of alined pins in each such set of holes, said pins having a press-fit in at least some of the side plates through which they extend, and the pins of the several sets being so arranged transversely of the chain that associated with each pair of adjacent chain-strands there are pins which extend through each strand of the pair and into the other strand of the pair.

8. In a chain, a plurality of parallel rows of inner links, pin-link side plates disposed between adjacent rows of inner links and at the outer side of each outer row of inner links, the inner links and the side plates being respectively alined transversely of the chain with each side plate overlapping adjacent inner links, said inner links and side-plates being provided with sets of alined holes extending transversely of the chain, and a plurality of pins in each such set of alined holes, the pins having a press-fit within at least some of the side-plates through which they pass, the pins in adjacent sets being staggered so that at least one pin will extend completely through each inner link and into pin link plates on opposite sides of it.

9. In a chain, a plurality of parallel rows of inner links, pin-link side plates disposed between adjacent rows of inner links and at the outer side of each outer row of inner links, the inner links and the side plates being respectively alined transversely of the chain with each side plate overlapping adjacent inner links, said inner links and side-plates being provided with sets of alined holes extending transversely of the chain, and a plurality of pins in each such set of alined holes, the pins of the several sets having a press-fit within at least some of the side plates through which they pass and being so arranged transversely of the chain that any plane perpendicular to the pins will intersect at intermediate points a plurality of pins located at intervals along the chain.

GEORGE G. MIZE.